United States Patent
Lebby et al.

[11] Patent Number: 6,158,884
[45] Date of Patent: Dec. 12, 2000

[54] INTEGRATED COMMUNICATIVE WATCH

[75] Inventors: Michael S. Lebby, Apache Junction; Karen E. Jachimowicz, Laveen; Davis H. Hartman, Chandler, all of Ariz.

[73] Assignee: Motorola, Inc., Schaumburg, Ill.

[21] Appl. No.: 09/105,948

[22] Filed: Jun. 26, 1998

[51] Int. Cl.[7] .................................. G04B 37/00
[52] U.S. Cl. .............. 368/282; 368/10; 368/47; 368/204; 368/223; 224/165; 224/167; 224/180
[58] Field of Search ................... 368/82, 10, 13, 368/204, 84, 223, 281, 282; 345/87; 362/254; 224/165–180

[56] References Cited

U.S. PATENT DOCUMENTS

| | | | |
|---|---|---|---|
| 4,470,708 | 9/1984 | Nee | 368/223 |
| 4,847,818 | 7/1989 | Olsen | 368/10 |
| 4,985,878 | 1/1991 | Yamada et al. | 368/223 |
| 5,239,521 | 8/1993 | Blonder | 368/10 |
| 5,262,763 | 11/1993 | Okuyama et al. | 368/223 |
| 5,526,006 | 6/1996 | Akahane et al. | 368/10 |
| 5,805,533 | 9/1998 | Daigle et al. | 368/82 |
| 5,860,740 | 1/1999 | Fujima | 368/10 |
| 5,872,744 | 2/1999 | Taylor | 368/13 |
| 5,889,737 | 3/1999 | Alameh et al. | 368/204 |
| 6,010,242 | 1/2000 | Ho | 368/10 |

*Primary Examiner*—Vit Miska
*Assistant Examiner*—Jeanne-Marguerite Goodwin
*Attorney, Agent, or Firm*—Eugene A. Parsons; William E. Koch

[57] ABSTRACT

A portable electronic device adapted to be worn on a user's wrist including an electronic unit including a transceiver for receiving and transmitting messages and a watch included within the electronic unit having movements for displaying a time of day. A wrist band including a plurality of electrically conductive fibers is electrically coupled to the electronic unit thereby creating an electronic circuit. A power source is integrated with the plurality of electrically conductive fibers fabricating the wrist band. At least one display is integrated with the electronic unit for the display of informative data.

20 Claims, 3 Drawing Sheets

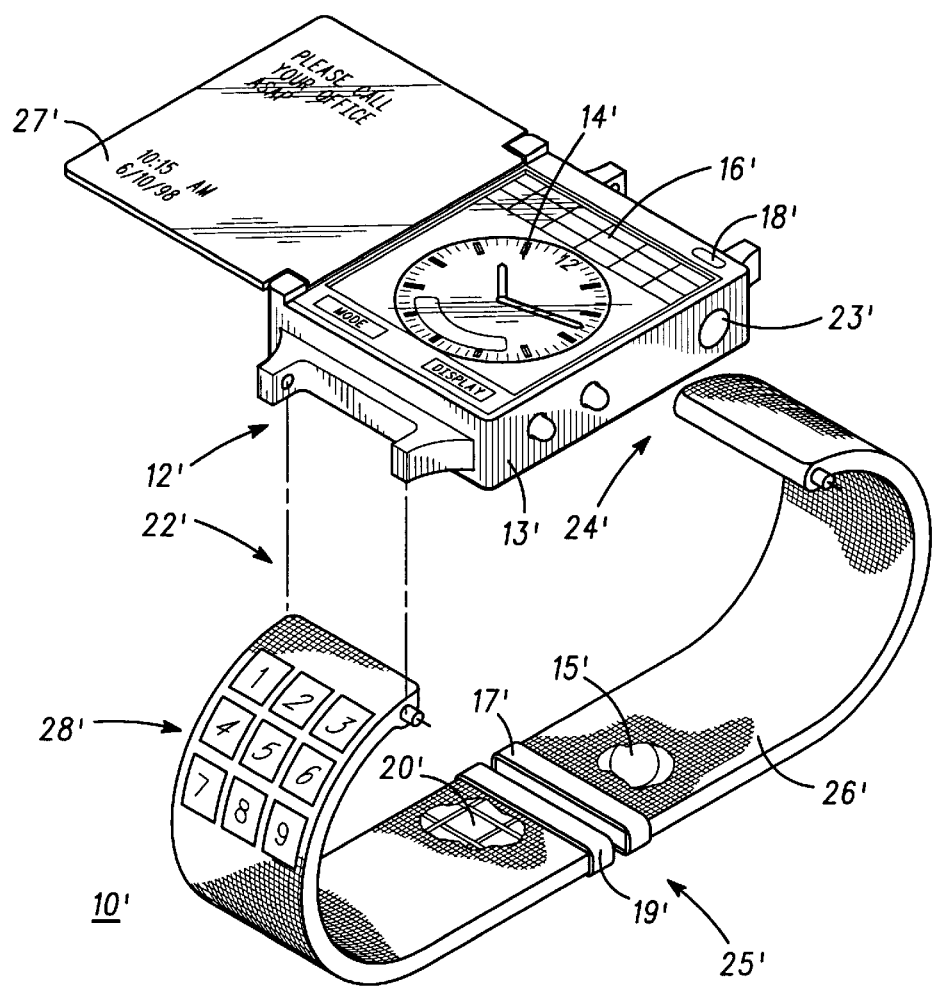
FIG. 1B
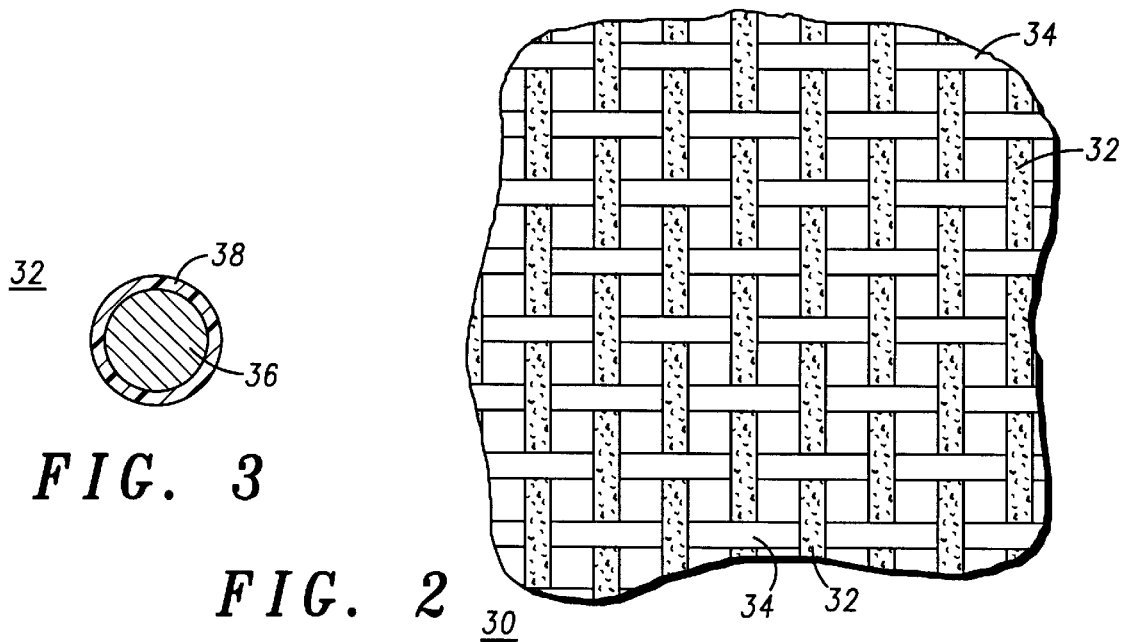
FIG. 3
FIG. 2

INTEGRATED COMMUNICATIVE WATCH

FIELD OF THE INVENTION

This invention relates, in general, to portable electronic equipment including integrated electronics and optical displays and, more particularly, to integrated portable electronic and portable communications equipment manufactured in the form of an integrated communicative watch.

BACKGROUND OF THE INVENTION

It is becoming quite common for the average individual to carry with them on a daily basis a watch, a pager, a cellular telephone, a small electronic address or data file, a micro-recorder, etc. The problem is that it is difficult and unwieldy to carry at once all of these various communication transceivers, such as pagers and cellular telephones, as well as these small electronic devices, such as clocks, alarms, data storage devices, micro-recorders, etc. Accordingly, consumer markets seek to combine these electronic devices, and thus continue to request smaller portable electronic devices which have greater functional features.

Generally speaking, the average person will wear a plurality of clothing articles on a daily basis to which will be attached or placed in a pocket of the clothing, a portable electronic device, such as a cellular telephone, a pager, a PDA, a micro-recorder, a small electronic address or data file, a clock/alarm, or some other similar portable electronic device. The problem is that it is often difficult and unwieldy to carry various communication transceivers, such as cellular phones, pagers and other devices.

Through the inclusion of functional fibers into the integration of these portable electronic devices, such as through the inclusion of metallic threads, and holographic optical fibers, devices can be fabricated which are both user friendly in allowing the wearer to better communicate with others, while minimizing the size of the portable electronic equipment that the user typically carries.

While, portable communications transceivers, such as cordless and cellular telephones, pagers, data banks and the like, are becoming increasingly popular, unfortunately, with respect to the visual interface, a single display typically is all that is available. Many users may like or require more than one visual image to be displayed at any one time, or greater amounts of information contained within one display.

In the instance where the operator requires a visual display on a communication transceiver to supply the operator with a visual message or graphical image, as previously stated, there exists a problem in that visual displays on prior art communications receivers are extremely limited in size and require relatively high electrical power, thus a large battery source, as well as a great amount of area to be sufficiently large to produce a quality display.

Thus, it would be highly desirable to provide for an integrated communicative portable electronic device, fabricated in the form of a wearable watch with smart straps, that includes various electronic devices, and optical displays, while maintaining the size and compactness of a conventional watch. The integrated communicative watch with smart straps provides for increased functionality of the watch through the integration of the electronics and electronic components into the watch band, hereinafter referred to as smart straps.

Accordingly, an integrated communicative watch with smart straps fabricated as a part thereof, that incorporates electrically conductive fibers within the smart straps for a wired coupling between a plurality of electronic devices, displays, and a power source would be highly advantageous.

It is a purpose of the present invention to provide for a new and improved integrated communicative watch with smart straps, including a plurality of electrically conductive fibers formed as a part of the smart straps, that provides for increased functionality of the integrated communicative watch.

It is a further purpose of the present invention to provide for an integrated communicative watch with smart straps that allows for the inclusion of a plurality of displays, so as to allow the user to fold out or slide out a display or multiple displays and/or project a displayed image on a wall or the like.

It is still another purpose of the present invention to provide a new and improved integrated communicative watch with smart straps that provides for the reduction in size of integrated portable communication devices by integrating a portion of the electronics or component parts into the smart straps.

It is a still further purpose of the present invention to provide for an integrated communicative watch with smart straps including a plurality of optical displays with associated electronic controls and/or associated keypads integrated with the smart straps that allows a user to interface with the unit and its functional components through the smart straps.

SUMMARY OF THE INVENTION

Briefly stated, provided is a multiple piece unit composed of a transceiving means for receiving and transmitting messages, an analog or digital watch having movements for displaying a time of day, a plurality of electronic fibers integrated with a plurality of straps thereby creating an electronic circuit, and an assembly for housing the transceiving means. The analog watch having at least one means for display of informative data.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

FIG. 1B is an isometric view of an integrated communicative watch with smart straps according to the present invention;

FIG. 2 is an enlarged top view of a portion of the smart straps according to FIG. 1;

FIG. 3 is a cross-sectional view of an electrically conductive fiber of the smart strap according to the present invention;

DETAILED DESCRIPTION OF THE DRAWINGS

Figure 1A:
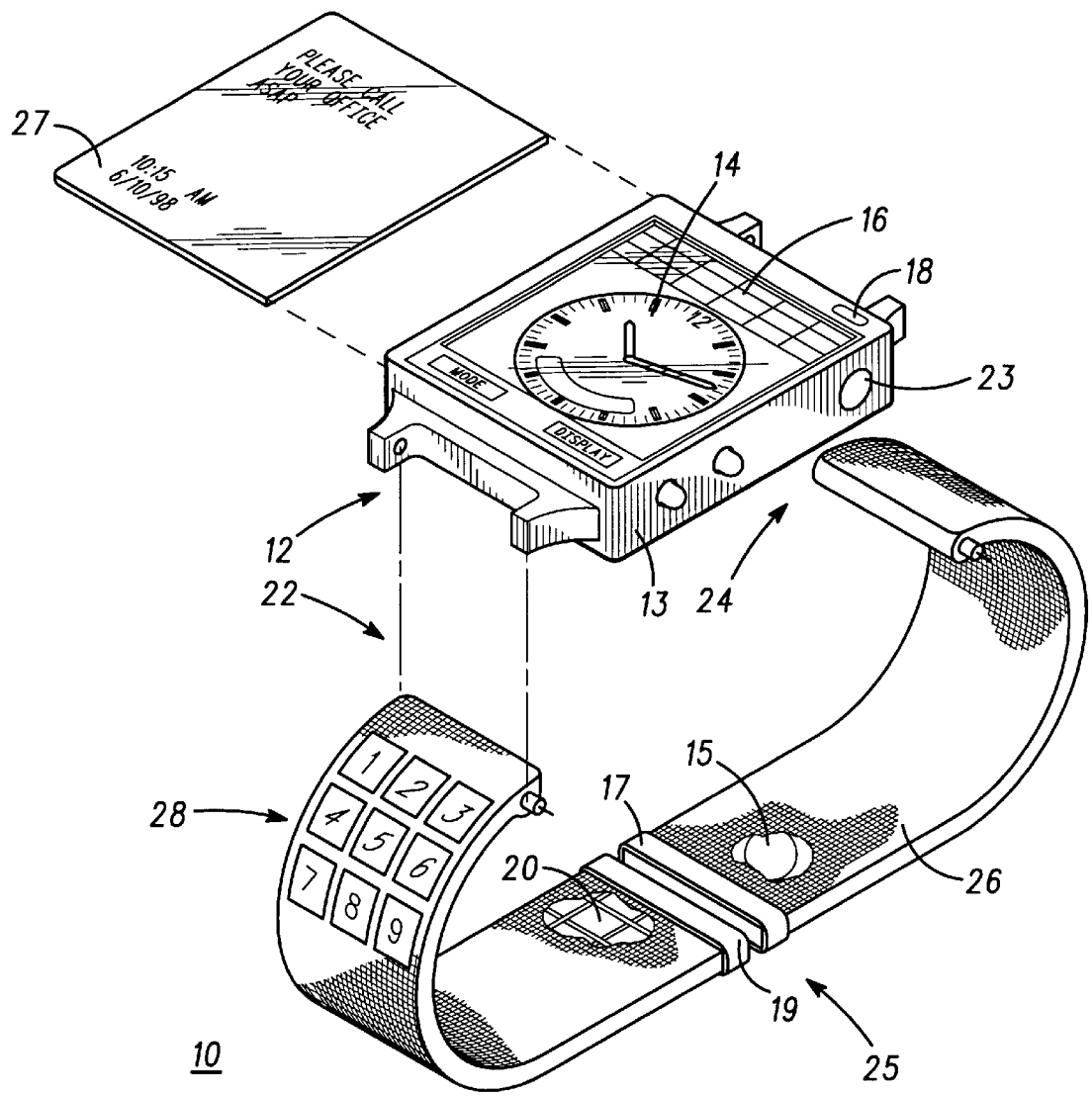
FIG. 1A is an isometric view of an integrated communicative watch with smart straps according to the present invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1A, there is illustrated therein an isometric view, an integrated communicative watch 10 having included as a part thereof, a plurality of straps or bands (discussed presently), for attaching the device to a user's wrist. As disclosed, any number of portable electronic devices, such as portable communications equipment, such as a two-way communication device, in the form of a radio frequency receiver and a radio frequency transmitter, infrared communications utilizing light emitting diode/vertical cavity surface emitting laser technology, and/or a paging device can be included in the device 10 of the present invention. Additionally, portable electronic devices such as a data bank or file, a SMART CARD storage and reader device, a micro-recorder, a micro-scanner, or portable scanner, such as a micro-electronic mechanical scanner made of silicon and including red, green and blue visible light beams, etc. can be included as an integrated part of the communicative watch 10 as disclosed herein. In this particular embodiment, disclosed is device 10 including an electronic unit 12 intended to be worn, for example, on a user's wrist. Typically, device 10 includes a watch and may be adapted for personal communication or personal computing. Accordingly, in a preferred embodiment, device 10 includes a conventional watch face and timing mechanism 14 as well as, for example, speaker and microphone means 16 and 18, respectively. Alternatively, if the device incorporates a pager and/or cellular telephone, there might be a small liquid crystal display and an audio annunciator. The electronics necessary for making a watch, or for that matter, a portable cellular phone, two-way radio or selective radio receiver, such as a pager, are well known in the art, and may be incorporated into the electronic unit 12. Electronic unit 12 is housed in a housing 13 typically made of any suitable well-known material in the art, such as plastic, metal, resin, or the like, as well as being formed by any well-known method in the art, such as molding, milling, or the like. However, in a preferred embodiment of the present invention, high impact plastic materials are injection molded to form housing 13.

The communication device and watch are incorporated into a housing 13 which includes at least first and second attachment clips 22 and 24. The attachment clips 22 and 24 may be simple pins or dowels as are commonly found in wristwatch applications for mechanically connecting a wrist band, or a plurality of straps, 26 to the watch. The clips 22 and 24 are further adapted to act as electrical contacts, electrically connecting electronic unit 12 to a plurality of functional electronics integrated with wrist band 26, including a power source 20 and transceiving means 15, for receiving and transmitting messages. While power source 20 integrated with device 10 and to which clips 22 and 24 are in electrical interface may be a conventional, prismatic or cylindrical battery cell, it is contemplated that such power source 20 will instead be fabricated of a conformal flexible material, thereby forming a flexible battery cell, which is further adapted and integrated with wrist band 26 (discussed presently). Flexible, conformed energy storage devices, and methods for making same, are fully disclosed in commonly assigned, co-pending U.S. patent application Ser. No. 08/494,463, filed on Jun. 23, 1996 in the name of Louie, et al., and entitled, "PACKAGING FOR AN ELECTROCHEMICAL DEVICE AND DEVICE USING SAME", the disclosure of which is incorporated herein by reference.

In this particular embodiment, power source 20 is disclosed as including a lithium ion type foil/flexible energy cell integrated with wrist band 26. It should be understood that in an alternative embodiment power source 20 includes a lithium polymer battery. Wrist band 26 is disclosed as fabricated from a textile material having integrated electrically conductive fibers (discussed presently).

Referring now to FIG. 2, illustrated in a greatly enlarged plan view is a portion of an inventive textile fabric 30 illustrating a plurality of individual conductive fibers and a plurality of non-conductive fibers. As disclosed, the inventive textile fabric with integrated electrically conductive fibers is characterized as emanating an electromagnetic field for inductive coupling the integrated power source to a recharger or capable of a wired interface with any additional integrated electronic functions and the integrated electronic devices of electronic unit 12 utilizing clips 22 and 24. Optionally included in this type of textile fabric would be displays, including holographic optical fibers. Dependent upon the layout of the electrically conductive fibers, circuits, antennas, or other similar electronic components can be integrated or formed therein textile fabric 30 and thus within wrist band 26. One premise for textile fabric 30 and wrist band 26 made thereof would be for the receipt and transmission of communicative signals through electromagnetic inductive coupling, and through a wired coupling with the integrated electronic devices.

In a preferred embodiment, the integrated electronics and/or device components of the portable electronic devices would be established with textile fabric 30, and more particularly through wrist band 26 comprised of the inventive textile fabric 30, utilizing a wired connection. Alternatively, textile fabric 30 would serve as an antenna, or the like for the receipt and transmission of communicative signals. In an alternative instance where inductive coupling is sought, inventive fabric 30 would allow for the establishment of an electric charge or a magnetic field between the wrist band 26 and a remote portable electronic device such as a power source recharger, based on the proximity of an electrified source, a magnet, or a magnetic field.

As illustrated in FIG. 2, fabric 30 is composed of a plurality of electrically conductive fibers, or metallic threads, 32 and a plurality of non-electrically conductive fibers, or non-metallic threads, 34 woven orthogonal so as to define a simple grid system. Textile fabric 30 is generally illustrated as including a space between conductive fibers 32 and non-electrically conductive fibers 34 so as to allow individual addressing of the plurality of fibers 32 and 34. It should be further understood that in this particular embodiment, conductive fibers 32 do not define cross-over points. Generally, speaking this type of grid system would allow for the electrical interface, more specifically the wired interconnect, with electronic unit 12 of FIG. 1A, through clips 22 and 24 and/or electronic or component parts of portable electronic device 10 integrated into wrist band 26. More particularly, electrically conductive fibers 32 would allow for the integration into textile fabric 30, more particularly wrist band 26, electronic components, such as semiconductor chips, a power source, a numeric keypad, such as a plurality of function buttons, or control keys 28, illustrated in FIG. 1A, a microphone, or other similar components typically found in a portable device that are individually addressable. This inclusion of electronic components or other similar components would allow for the reduction in size of electronic unit 12 and therefore device 10.

Referring now to FIG. 3, illustrated in simplified cross-sectional view is a single electrically conductive fiber 32 according to the present invention. In this particular example, electrically conductive fiber 32 is composed of a central metallic core 36 and an insulative overcoating layer 38. Central metallic core 36 is described as composed of an electrically conductive material, which may include a metallic material, a semi-metallic material, a semi-insulative material, a semi-conductive material, a transparent conductive material and any other fiber material that provides sufficient current to induce wired or wireless coupling between textile fabric 30 and portable electronic unit 12.

Insulative overcoating 38 is disclosed as composed of an insulative material, such as KELVAR, as commonly used in the fiber optic industry, a plastic material, such as any organic polymer based material, for example PMMA or polyimide, or some other similar insulative material. Insulative overcoating 38 serves to insulate central metallic core 36 from defining electrical connections where they are not desired. In particular, insulative overcoating 38 prevents electrical cross-talk, more specifically, signal crossings from one conductive fiber 32 to another. It is additionally disclosed, that conductive fibers 32 are alternatively formed of a solid metallic fiber, or a fiber having a non-metallic core and a metallic overcoating. Electrically conductive textile fabrics, are fully disclosed in commonly assigned, co-pending U.S. patent application Ser. No. 09/069,621, filed on Apr. 29, 1998 in the name of Lebby et al., and entitled, "TEXTILE FABRIC WITH INTEGRATED ELECTRICALLY CONDUCTIVE FIBERS AND CLOTHING THEREOF".

Referring again to FIG. 1A, wrist band 26 includes a fastener 25 that in cooperation with clips 22 and 24 create a complete electrical circuit for operation of electronic unit 12 and any additional electronic components integrated with wrist band 26. Fastener 25 provides for removable attachment of device 10 to the wrist of a user. Generally fastener 25 provides for a first end of wrist band 26 to be releasably attached to a second end of wrist band 26, when ends are disposed essentially each other. It should be understood, that fastener 25 is but one example of a fasteners capable of completing an electrical circuit through device 10 and that other designed fastener, such as a standard multi-piece buckle, mechanical clasp, or similar fastening devices accomplishing the same goal are anticipated by this disclosure. Electronic unit 12 is powered by power source 20 integrated with wrist band 26 through the plurality of electrically conductive fibers 32 as described with regard to FIGS. 2 and 3.

As illustrated in FIG. 1A, device 10 includes a display 27, which in this particular embodiment is disclosed as a slide-out display, housed within electronic unit 12 when not in use. As illustrated in FIG. 1B, device 10' includes a display 27', which in this particular embodiment is disclosed as a hingedly attached display. It should be noted that all components of the first embodiment, as illustrated in FIG. 1A, that are similar to components of the second embodiment, as illustrated in FIG. 1B, are designated with similar numbers, having a prime added to indicate the different embodiment. Display 27 is disclosed as being any of a liquid crystal display, a light emitting device display, an electroluminescent display, or any other similar type display well known in the art through which information may be viewed by the user as a direct view image and/or miniature virtual image, dependent upon the integrated display component. Virtual image displays are fully disclosed in commonly assigned, U.S. Pat. No. 5,224,198, issued on Jun. 29, 1993, entitled, "WAVEGUIDE VIRTUAL IMAGE DISPLAY" and co-pending U.S. patent application Ser. No. 08/371,674, filed Jan. 12, 1995 which is a continuation of U.S. patent application Ser. No. 08/116,836, filed Sep. 7, 1993, entitled "MINIATURE VIRTUAL IMAGE COLOR DISPLAY".

Display 27 allows device 10 to enable the user to ascertain general types of information regarding data or information stored in the electronics of device 10, such as data bank or file type information, or to receive transmitted communications. Display 27 is made by any suitable method or technology, such as, but not limited to, liquid crystal display technology, including polymer based liquid crystal displays, vacuum field emission device technology, electroluminescent technology, plasma liquid crystal technology, light emitting diode technology, including organic light emitting diode arrays, laser display technology, including vertical cavity surface emitting laser arrays, or the like. For simplicity, light emitting diode technology will be utilized throughout this description for display 27.

Figure 4:
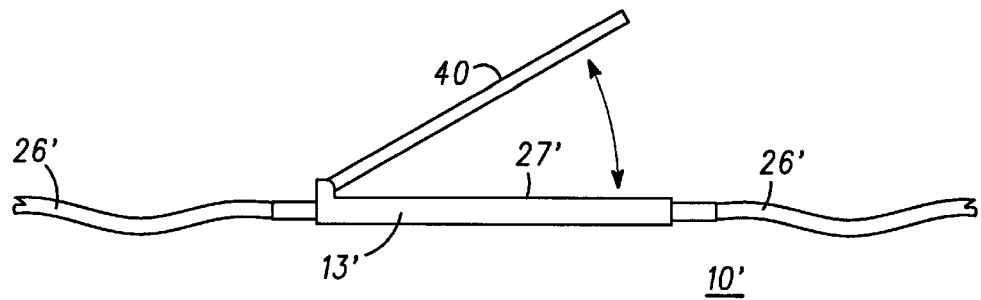
FIG. 4 is a side view of an integrated communicative watch with smart straps according to the present invention illustrating a single fold-out display.
Figure 5:
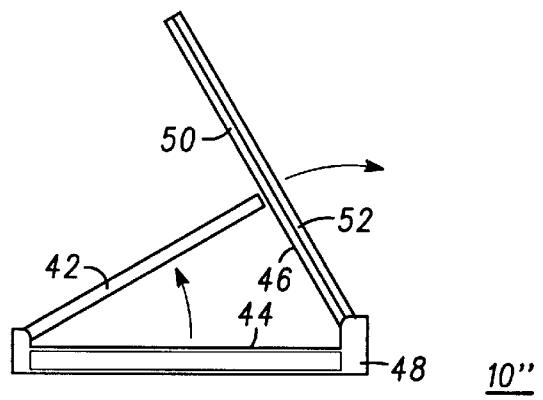
FIG. 5 is a side view of an alternative embodiment of an integrated communicative watch with smart straps according to the present invention illustrating a multiple fold-out display.
Figure 6:
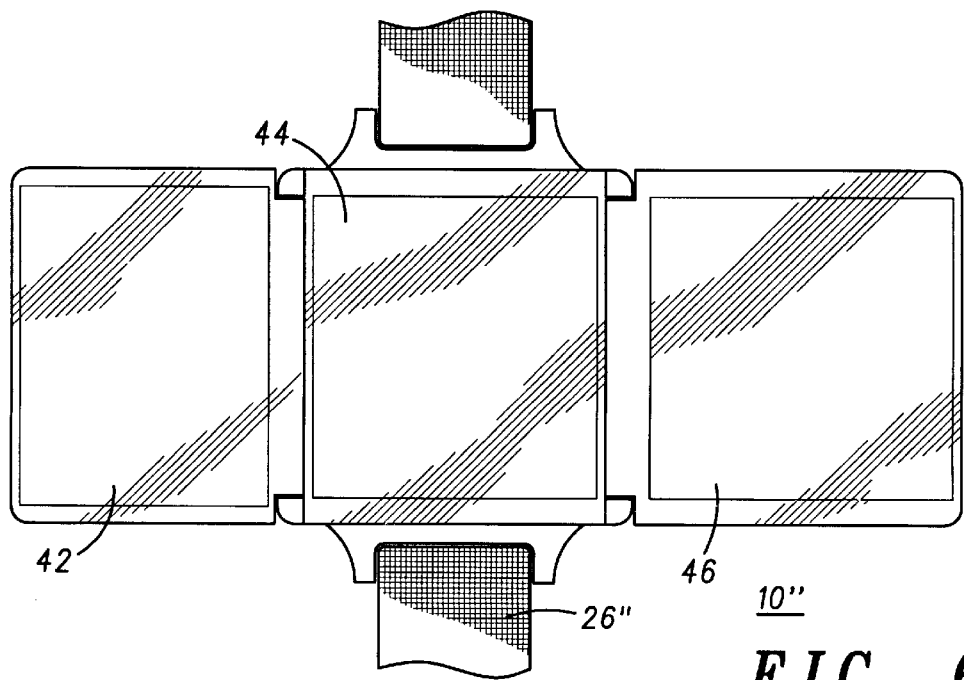
FIG. 6 is a top view of the watch of FIG. 3 illustrating the multiple fold-out display in an open or operable position.

Referring now to FIGS. 4–6 illustrated are a plurality of alternative embodiments for device 10 according to the present invention. More particularly, disclosed are a plurality of embodiments depicting various display configurations, generally of the type previously described with regard to display 27. Referring now to FIG. 4, illustrated in simplified side sectional view is device 10', fabricated generally similar to device 10 of FIG. 1A, except in this particular embodiment a moveable portion 40 is fabricated so as to be hingedly attached to housing 13'. In this particular embodiment, moveable portion 40 is generally similar to electronic unit 12 of FIG. 1A. This design will allow for a display 27' to be viewed when moveable portion 40 is in a "swing-up" position. When moveable portion 40 is in a "closed" position, display 27' would be in an "off" mode and integrated electronic components, such as a clock, cellular telephone, microphone, speaker, would be operational. Generally similar to device 10 of FIG. 1A, device 10' includes an electronic circuit fabricated from wrist band 26' in the form of electrically conductive fibers, that are in electrical interface with moveable portion 40.

Referring now to FIGS. 5 and 6, illustrated in a simplified side sectional view and in top view is an additional alternative embodiment of an integrated communicative watch according to the present invention. Illustrated is a device 10", generally similar to device 10 of FIG. 1A. Device 10" includes a plurality of integrated electronic components and a plurality of displays 42, 44, and 46. Displays 42, 44 and 46 are hingedly attached to a housing 48 and are fabricated according to the displays previously described with regard to display 27 of FIG. 1A. In this particular embodiment display 46 is formed on an opposed surface of an electronic unit 50, generally similar to electronic unit 12 of FIG. 1A. This fabrication on an opposed surface of display 46 allows for operation and thus viewing of a clock, etc. on a surface 52, when displays 42 and 46 are in a closed position.

In general, device 10, and its alternative embodiment 10' and 10", include the electronics for a complete communication device, such as a cellular telephone, pager, or the like, similar in operation to standard cellular telephone, and pagers presently on the market. It should be understood that any number, consisting of only one to many, electronic devices can be incorporated into device 10, either housed in electronic unit 12, and or integrated with wrist band 26. The cellular telephone or pager incorporated into device 10 of the present invention, as stated, is similar to those currently found on the market, except that in this specific embodiment greater amounts of information or combination of alphanumerics and graphics could be received and viewed through the integrated displays.

In function, several electronic modes may be selected to improve convenience and efficiency of device 10, 10' or 10". For example, when device displays, such as display 27 of FIG. 1A, or displays 42, 44 and 46 of FIG. 6 are in a closed position, the user can configure the electronics to turn OFF the display, and/or any additional electronic devices integrated as a part of the device that the user is not utilizing at that time to save on power consumption. At the same time, the user can configure the specific devices to remain in an ON position when displays 27, 42, 44, and 46 are in a closed position, such as the clock/alarm, cellular telephone, pager, etc., or configure the device so that the displays will be usable in the open position, thus enabling graphical and textual materials to be displayed on the associated displays, 27, 42, 44, and 46.

Generally, housing 13 is designed and constructed such that included are a variety of electronics (discussed presently), for operable interfacing and/or connection of an audio input/output, an input/output connection port, an infra-red projection port 23 for the display of projected data utilizing infra-red semiconductor lasers, and display 27. The electronics of device 10 may include a computer, more specifically a plurality of components such as a central Micro-Processing Unit (MPU), a memory, logic circuitry, and the like that are interconnected with electronic unit 12 through standard wired interconnects within housing 13 and/or through the electrically conductive fibers 32 of wrist band 26. Additionally, it should be noted that specific positioning of the various electronic components of device 10 are application specific, thus enabling a wide range of locations and thus integration for the electronic components.

Control keys 28 as illustrated in FIG. 1A are located for convenient use by the operator so as to select a variety of controls or electronic functions, such as contrast, brightness, cursor movement, mode of operation, interfacing, etc. Control keys 28, for example, can include a standard OFF-ON switch and a finger control device such as a miniature trackball or a touch pad, as well as a standard numeric keypad.

An audio input/output, more specifically speaker 16 and microphone 18 of FIG. 1A, are coupled to circuitry/software so that audio information or data are inputted into circuitry/software and ultimately utilized and processed by a central micro-processing unit (MPU) (not shown). The audio input/output enables central MPU to be voice operated, thus enabling voice commands to be issued to the central MPU. Further, since the audio input/output is coupled to the central MPU, audio input/output enables the recordation of voice memos as desired, when a micro-recording device is incorporated into device 10, more particularly in electronic unit 12 as well as audible signals emitted such as used with cellular and/or pager devices.

By now it should be appreciated that a novel integrated communicative watch with smart straps has been described. The communicative watch allows for a more convenient and efficient means for incorporating electronic devices, including communication devices, in the form of a conventional watch, or timepiece. The communicative watch enables a user to easily carry on their person several small, portable electronic devices, including, but not limited to, a paging device, a data bank or file, an address book, a micro-recorder, a SMART CARD reader, etc., while maintaining function of a standard clock/alarm. Further, the electronic communicative watch enables the user to utilize electronic medium material in the form of a standard watch having a single display screen or a plurality of display screens.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A portable electronic device adapted to be worn on a user's wrist, the portable electronic device comprising:

an electronic unit including at least one electronic component;

a watch included within the electronic unit having movements for displaying a time of day;

a wrist band including a plurality of electrically conductive fibers and a plurality of non-conductive fibers woven orthogonal to one another to define a simple grid, electrically coupled to the electronic unit thereby creating an electronic circuit;

a power source integrated with the plurality of electrically conductive fibers, the plurality of electrically conductive fibers and the plurality of non-conductive fibers characterized as emanating an electromagnetic field for inductive coupling of the power source to a remote portable electronic device, thereby creating an electronic circuit;

an assembly for housing the electronic unit, the assembly including contacts electrically coupled to the plurality of electrically conductive fibers; and at least one display integrated with the assembly for the display of informative data.

2. A portable electronic device adapted to be worn on a user's wrist as claimed in claim 1 wherein the at least one electronic component includes a transceiving means for receiving and transmitting messages.

3. A portable electronic device adapted to be worn on a user's wrist as claimed in claim 2 wherein the transceiving means includes at least one of a pager or a cellular telephone.

4. A portable electronic device adapted to be worn on a user's wrist as claimed in claim 1 wherein the power source includes a flexible battery cell.

5. A portable electronic device adapted to be worn on a user's wrist as claimed in claim 4 wherein the flexible battery cell is a lithium polymer battery.

6. A portable electronic device adapted to be worn on a user's wrist as claimed in claim 4 wherein the flexible battery cell is a lithium ion foil battery.

7. A portable electronic device adapted to be worn on a user's wrist as claimed in claim 1 wherein the wrist band includes a releasably secure fastener and having a first end disposed essentially opposite a second end, the electronic unit being mechanically and electrically coupled to the wrist band between the first end and the second end.

8. A portable electronic device adapted to be worn on a user's wrist as claimed in claim 1 wherein the at least one display is slidably mounted within the electronic unit.

9. A portable electronic device adapted to be worn on a user's wrist as claimed in claim 1 wherein the at least one display is hingedly attached to assembly for housing the electronic unit.

10. A portable electronic device adapted to be worn on a user's wrist, the portable electronic device comprising:

an electronic unit including a transceiving means for receiving and transmitting messages;

a watch included within the electronic unit having movements for displaying a time of day;

a wrist band including a plurality of electrically conductive fibers and a plurality of non-conductive fibers woven orthogonal to one another electrically coupled to the electronic unit thereby creating an electronic circuit;

a power source integrated with the plurality of electrically conductive fibers, the plurality of electrically conductive fibers and the plurality of non-conductive fibers characterized as emanating an electromagnetic field for inductive coupling of the power source to a remote portable electronic device, thereby creating an electronic circuit;

an assembly for housing the electronic unit, the assembly including contacts electrically coupled to the plurality of electrically conductive fibers; and at least one display integrated with the assembly for the display of informative data.

11. A portable electronic device adapted to be worn on a user's wrist as claimed in claim 10 wherein the at least one display includes one of a liquid crystal display vacuum field emission display, an electroluminescent display, a plasma liquid crystal display, a light emitting diode display, or a laser display.

12. A portable electronic device adapted to be worn on a user's wrist as claimed in claim 11 wherein the laser display further includes a vertical cavity surface emitting laser display.

13. A portable electronic device adapted to be worn on a user's wrist as claimed in claim 11 wherein the power source includes a flexible battery cell.

14. A portable electronic device adapted to be worn on a user's wrist as claimed in claim 11 wherein the portable electronic device further includes a microphone and a speaker, electrically coupled to the electronic unit.

15. A portable electronic device adapted to be worn on a user's wrist as claimed in claim 11 wherein the wrist band includes a releasably secure fastener and having a first end disposed essentially opposite a second end, the electronic unit being mechanically and electrically coupled to the wrist band between the first end and the second end.

16. A portable electronic device adapted to be worn on a user's wrist, the portable electronic device comprising:

an electronic unit including at least one of a pager circuitry or a cellular telephone circuitry;

a watch included within the electronic unit having movements for displaying a time of day;

a wrist band including a releasably secure fastener and having a first end disposed essentially opposite a second end, the electronic unit being mechanically and electrically coupled to the wrist band between the first end and the second end, the wrist band further including a plurality of electrically conductive fibers and a plurality of non-conductive fibers woven orthogonal to one another electrically coupled to the electronic unit thereby creating an electronic circuit;

a power source integrated with the plurality of electrically conductive fibers, the plurality of electrically conductive fibers and the plurality of non-conductive fibers characterized as emanating an electromagnetic field for inductive coupling of the power source to a remote portable electronic device, thereby creating an electronic circuit;

an assembly for housing the electronic unit, the assembly including contacts electrically coupled to the plurality of electrically conductive fibers; and at least one display integrated with the assembly for the display of informative data.

17. A portable electronic device adapted to be worn on a user's wrist as claimed in claim 16 wherein the at least one display includes one of a liquid crystal display vacuum field emission display, an electroluminescent display, a plasma liquid crystal display, a light emitting diode display, or a laser display.

18. A portable electronic device adapted to be worn on a user's wrist as claimed in claim 17 wherein the laser display further includes a vertical cavity surface emitting laser display.

19. A portable electronic device adapted to be worn on a user's wrist as claimed in claim 16 wherein the power source includes a flexible battery cell.

20. A portable electronic device adapted to be worn on a user's wrist as claimed in claim 16 wherein the portable electronic device further includes a microphone and a speaker, electrically coupled to the electronic unit.

* * * * *